United States Patent
Eswara et al.

(10) Patent No.: US 9,064,150 B2
(45) Date of Patent: Jun. 23, 2015

(54) AERIAL IMAGE SEGMENTATION FOR REFINERIES

(71) Applicant: Honeywell International Inc., Morristown, NJ (US)

(72) Inventors: Lalitha M. Eswara, Bangalore (IN); Chetan Nadiger, Bangalore (IN); Kartavya Mohan Gupta, Alwar (IN)

(73) Assignee: Honeywell International Inc., Morristown, NJ (US)

( * ) Notice: Subject to any disclaimer, the term of this patent is extended or adjusted under 35 U.S.C. 154(b) by 79 days.

(21) Appl. No.: 13/889,740

(22) Filed: May 8, 2013

(65) Prior Publication Data

US 2014/0334667 A1 Nov. 13, 2014

(51) Int. Cl.
*G06K 9/34* (2006.01)
*H04N 7/00* (2011.01)
*G06K 9/00* (2006.01)
*G06T 7/40* (2006.01)
*G01C 11/00* (2006.01)
*G06T 7/00* (2006.01)
(Continued)

(52) U.S. Cl.
CPC .............. *G06K 9/0063* (2013.01); *G01C 11/00* (2013.01); *G06T 7/00* (2013.01); *G06K 9/00791* (2013.01); *G06T 7/602* (2013.01); *G03B 15/006* (2013.01); *G06T 7/0081* (2013.01); *G06T 7/0083* (2013.01); *G06T 7/0095* (2013.01); *G06T 7/403* (2013.01); *G06T 7/408* (2013.01); *G06T 2207/10032* (2013.01); *G06T 2207/20021* (2013.01); *G06T 2207/30184* (2013.01); *G06T 2207/30188* (2013.01); *G06K 9/00637* (2013.01); *G06K 9/00657* (2013.01)

(58) Field of Classification Search
CPC . G06K 9/0063; G06K 9/00791; G01C 11/00; G06T 7/00; G06T 7/602
USPC ......... 382/109, 113, 164, 165, 168, 173, 224, 382/225, 284, 298; 345/418, 604; 348/113
See application file for complete search history.

(56) References Cited

U.S. PATENT DOCUMENTS

| 4,940,990 | A |   | 7/1990 | Kharadly et al. |
|-----------|---|---|--------|-----------------|
| 5,144,685 | A | * | 9/1992 | Nasar et al. ................... 382/153 |
| 5,629,626 | A | * | 5/1997 | Russell et al. ................ 324/345 |

(Continued)

OTHER PUBLICATIONS

"Anonymous: Premcor Blue Island Refinery", [online], Retrieved from the Internet: <URL: http://www.epa.state.il.us/commmunity-relations/images/premcor-refinery.pdf>, (Jun. 1, 2004), 1 pg.

(Continued)

*Primary Examiner* — Kanjibhai Patel
(74) *Attorney, Agent, or Firm* — Schwegman Lundberg & Woessner, P.A.

(57) ABSTRACT

A system receives a two-dimensional digital image of an aerial industrial plant area. Based on requirements of image processing, the image is zoomed in to different sub-images, that are referred to as first images. The system identifies circular tanks, vegetation areas, process areas, and buildings in the first image. The system formulates a second digital image by concatenating the first images. The system creates one or more polygons of the regions segmented in the second digital image. Each polygon encompasses a tank area, a vegetation area, a process area, or a building area in the second digital image, which is a concatenated image of the individual regions. The system displays the second digital image on a computer display device.

20 Claims, 8 Drawing Sheets (51) Int. Cl.
*G06T 7/60* (2006.01)
*G03B 15/00* (2006.01)

(56) References Cited

U.S. PATENT DOCUMENTS

| | | | |
|---|---|---|---|
| 5,943,164 A * | 8/1999 | Rao | 359/462 |
| 6,735,518 B2 | 5/2004 | Kim | |
| 7,212,670 B1 * | 5/2007 | Rousselle et al. | 382/173 |
| 7,487,114 B2 * | 2/2009 | Florance et al. | 705/27.2 |
| 7,639,842 B2 * | 12/2009 | Kelle et al. | 382/109 |
| 7,835,578 B2 * | 11/2010 | Cheng et al. | 382/176 |
| 2010/0074143 A1 | 3/2010 | Ewing | |
| 2010/0077286 A1 | 3/2010 | Guagenti | |
| 2012/0113868 A1 | 5/2012 | Cummings | |

OTHER PUBLICATIONS

"Anonymous: Google Maps Snapshot", [online]. Retrieved from the Internet: <URL: https://maps.google.de/maps?q=homan+avenue++blue+island&hl =de&11=41.658525,-87.706604&spn=0.009803,0.021436&s11=41.757867,-87.72068&sspn=0.156609, 0.342979&hnear=Homan+Ave,+Blue+Island,+Illinois,+USA&t=h&z=17> (Aug. 20, 2014), 1 pg.

"European Application Serial No. 14165341.0, European Search Report mailed Sep. 3, 2014", 3 pgs.

"European Application Serial No. 14165341.0, Office Action mailed Sep. 18, 2014", 9 pgs.

Haralick, R. M., "Statistical and Structural Approaches to Texture", *Proceedings of The IEEE*, 67(5), (1979), 736-804.

Yuehuan, Wang, et al., "Multi-class target recognition based on adaptive feature selection", *Proceedings of SPIE*, vol. 7696—*Automatic Target Recognition XX: Acquisition, Tracking, Pointing, and Laser Systems Technologies XXIV: and Optical Pattern Recognition XXI*, (2010), 769609-1-76909-9.

Zimnermann, Petra, "A New Framework for Automatic Building Detection Analysing Multiple Cue Data", *International Archives of Photogrammetry and Remote Sensing*, vol. XXXIII, Part B3, [online]. Retrieved from the Internet: <URL: http://www.isprs.org/proceedings/XXXIII/congress/part3/1063 XXXIII-part3.pdf>, (2000), 1063-1070.

* cited by examiner

AERIAL IMAGE SEGMENTATION FOR REFINERIES

TECHNICAL FIELD

The present disclosure relates to aerial image segmentation, and in an embodiment, but not by way of limitation, aerial image segmentation for use in connection with images of refineries.

BACKGROUND

Aerial Image Segmentation is an important area for multiple analyses in a refinery. One such analysis is planning the number of radio frequency (RF) nodes to be installed for seamless connectivity. This is an important requirement for estimating wireless planning in industrial applications such as plants or refineries. In this context, an RF planning tool can be critical for detailed planning, considering the clutter and the terrain region, to design a good propagation model. Ideally, three dimensional mapping helps in giving height information for generating an appropriate RF propagation model for the tool. However, in a pre-sales situation, when the pre-sales person pitches the customer (e.g., a plant owner) on the propagation model for the plant for estimating the location and number of wireless nodes to be deployed, there are normally no plant detail data for three dimensional modeling. At this stage, it would be helpful if an approximate number of nodes and their placement could be computed, notwithstanding the absence of detailed plant data for three dimensional modeling.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, electrical, and optical changes may be made without departing from the scope of the present invention. The following description of example embodiments is, therefore, not to be taken in a limited sense, and the scope of the present invention is defined by the appended claims.

To address the issues relating to a lack of detailed plant data in pre-sales and other similar situations, one or more embodiments in this disclosure compute an approximate model using data that is available to the sales team. In these pre-sales cases, the only data available are normally public data, for example, Google® Maps image data. Even though such data is two dimensional data, this two dimensional data relating to regions of tanks, vegetation clusters such as forests or smaller areas of trees, buildings, and process areas in the plant or industrial area are useful for generating a model and for approximating the number and placement of nodes. Largely, the refineries contain the above mentioned areas that are primary, and other areas such as small sheds, parking, etc. can be classified as buildings area. Additionally, clutter, terrain, and land usage can give important information for the model to determine inventory requirements. This information is derived from and approximated using the regions (tanks, vegetation, buildings, etc.) mentioned above. Given this context, the basic requirement is to provide region-based classifications as mentioned above with the use of aerial images of the region of interest and provide the user with all the region details, which need to be solved as appropriate.

An embodiment focuses on providing a novel solution framework to address the problem of region segmentation of an industrial plant such as a refinery into tank farm, process, building, and forest (vegetation) areas. This segmentation can then be used to assist in modeling for sales planning or such applications wherein refinery map regions are useful. An embodiment uses as input readily available aerial images of the region of interest. The classification problem is formulated into a segmentation problem, and image processing techniques are used for the segmentation. The aerial view images are located using lat-long and then zoomed in to higher or required magnification if required, for segmentation. Each zoomed in image is separately segmented and results are stitched together for formulation of region classification at specified lat-long. The zooming in is performed when the resolution of image is insufficient for region segmentation. The embodiment includes three parts. First, the regions are detected as individual tanks, vegetation areas, and process areas. Second, individual adjacent regions are grouped by appropriately drawing polygons around the identified areas. The building areas are identified and segmented as those areas that remain after the tank, vegetation, and process areas have been identified after drawing respective polygons. The third part relates to situations wherein the zooming in of input images is required for appropriate input image resolution. The third part contains formulating the larger area un-zoomed image area by appropriately placing the zoomed in versions of the images. This is primarily the case when the overall larger aerial image has less resolution, but zooming in to the area can result in the same resolution sub-images. It is noted that higher resolution helps good region segmentation. Specifically, indicating lat-lon (in Google® Maps) and obtaining zoomed in versions of the overall image is one embodiment. Region processing is performed on the zoomed in images. It is to be noted that the approach of parts one and two above can be executed individually and without the third part.

A means of an embodiment is to use human visual system features as much as possible for segmentation. Layered segmentation can also be used for this purpose. Tanks are the easiest to segment since they are circular or near-circular. Consequently, tank farms are segmented first. Convex hull/Delaunay polygons are used to obtain the polygons for enclosing the tank and other areas. Vegetation areas are segmented next based on color information. The system can be configured to segment vegetation areas based on the green color of the vegetation (or the orange, red, or yellow colors that are prevalent in the fall). Next, any process areas are segmented using the concept of edge density patterns, one such implementation being block-based gradient density. Any remaining areas are then assumed to be building areas and no separate segmentation is needed.

An embodiment can work with Google images based on latitude and longitude information or any other type of aerial information and data. As noted above, the identification and segmentation of the areas of an industrial complex can be used in connection with tools that are used for the estimation and placement of wireless nodes or any such applications.

In short, an embodiment provides a systematic image region elimination method for region segmentation. This helps reduce false alarms in subsequent layered segmentation processes. The system uses visual attention consisting largely of color, texture, and edge features and information. The system can put emphasis on how the differentiation of the human visual system can segregate. For example, process areas in a refinery normally contain cluttered pipelines, which manifest themselves as long lines and high edges. This distinguishing pattern is therefore used for region segmentation. The system also uses Delaunay triangulation for region polygon formulation and bounding the region containing pipes and similar structures.

FIGS. 1, 3, 4, 5, 7, and 8 are flowcharts of example operations for segmenting images of industrial areas. The segmented images can be used to assist in the placement of wireless RF nodes. FIGS. 1, 3, 4, 5, 7, and 8 include a number of process blocks 110-170, 305-340, 410-460, 510-570, 710-760, and 810-870. Though arranged serially in the examples of FIGS. 1, 3, 4, 5, 7, and 8, other examples may reorder the blocks, omit one or more blocks, and/or execute two or more blocks in parallel using multiple processors or a single processor organized as two or more virtual machines or subprocessors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Figure 1:
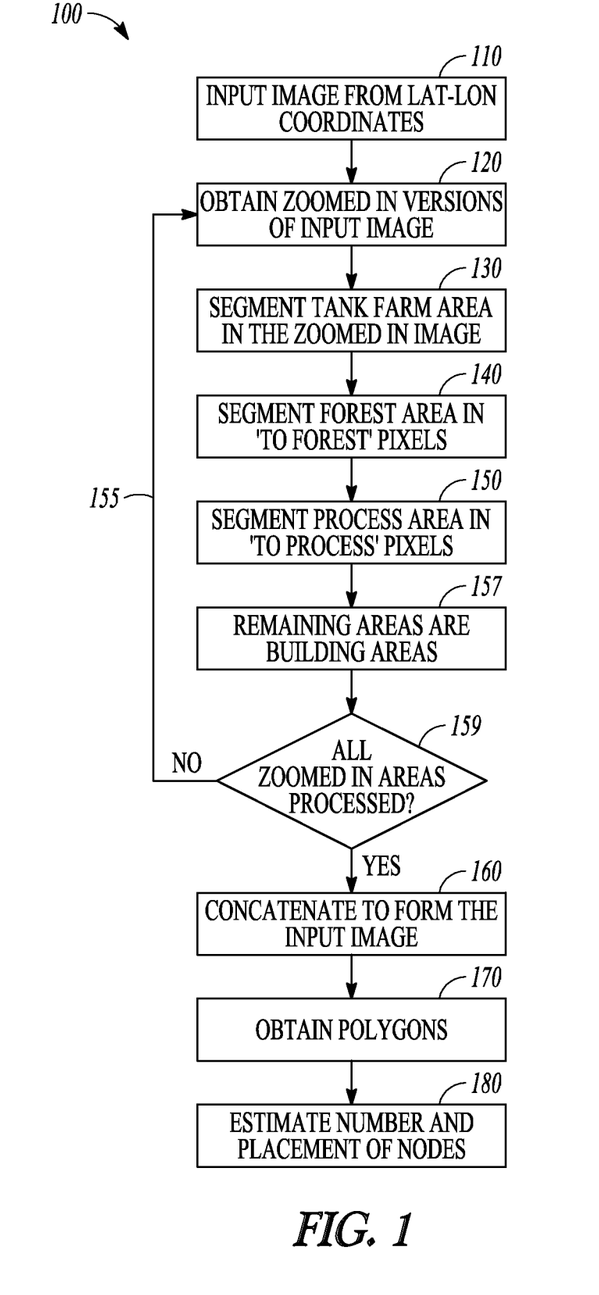
FIG. 1 is a flowchart of an example embodiment of a process to identify and segment different areas in an industrial area such as a refinery.

FIG. 1 is a flowchart of an example embodiment of a process 100 to identify and segment different areas in an industrial area such as a refinery. An input image is received at block 110. The input image can be received from a publicly available source such as Google® Maps or any other aerial image repository. The input image can be derived from latitude and longitude information. The input image can also be an aerial image of an industrial area such as an image from Google Image Maps. At 120, zoomed-in versions of the input image are generated if the image resolution of the industrial area coverage is not sufficient for accurate image processing. The area that is zoomed-in is part of the industrial area of interest for the image segmentation task. In situations where the input image resolution is very high, zooming in may not be necessary. At 130, any tank farm area in the industrial area is identified and segmented (See FIG. 2). As noted above, since the tanks are generally round, they are relatively easy to identify and segment, and therefore, in an embodiment, the tanks are identified and segmented first. Then, as indicated at 140, vegetation areas are identified and segmented. As previously noted, the identification and segmentation of the vegetation area is a color-based identification and segmentation. At 150, any process areas are identified and segmented. In an embodiment, process areas are pipeline areas in a refinery. At 157, any remaining areas of the image are identified and segmented as building areas. As indicated by arrow 155, operations 120-150 can be repeated multiple times, until all the zoomed in versions of the required industrial plant area are covered and their respective tank farms, vegetation areas, and process areas have been identified. At 159, a check if all the zoomed in images are segmented is performed. After all areas have been identified for all the zoomed in images, these images are appropriately concatenated at 160 to form the final image, which is obtained either from Google Maps through lat-long, or from any other aerial image obtained from another source. Then at 170, polygons are created to surround each identified area in order to segment the areas. At 180, the number and placement of wireless nodes is estimated using the identified and segmented tank, vegetation, process and building areas for the concatenated image. For example, barrier and blocking aspects to wireless signals of the tank, vegetation, process, and building areas are considered in the placement of the wireless nodes.

Figure 2:
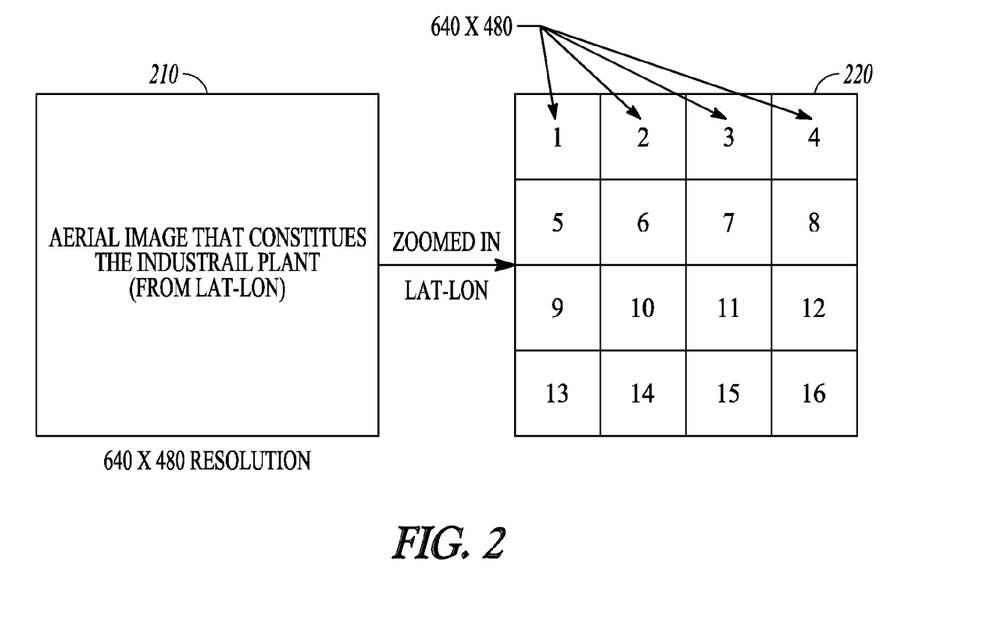
FIG. 2 illustrates an example of zoomed in image formulation and reconstruction.

FIG. 2 illustrates an example of the zoomed in formulation and reconstruction of images. An aerial image 210 of an industrial plant has, for example, a 640×480 resolution. The image 210 is zoomed in (for example using lat-lon feature of Google Maps) into sub-images 220. Each of the zoomed in sub-images 220 have a resolution that is equal to the initial aerial image 210, in this example, 640×480. In reconstruction of the image, the sub-images are placed in their initial locations after processing. This placement forms a larger industrial image (after region segmentation). To bring the image to the size of the original image after segmentation, for example 640×480, the zoomed in image of FIG. 2 can be resized accordingly. In situations wherein the input image size is very large such that sub-images are of appropriate resolution, this zooming in step may not be required.

Figure 3:
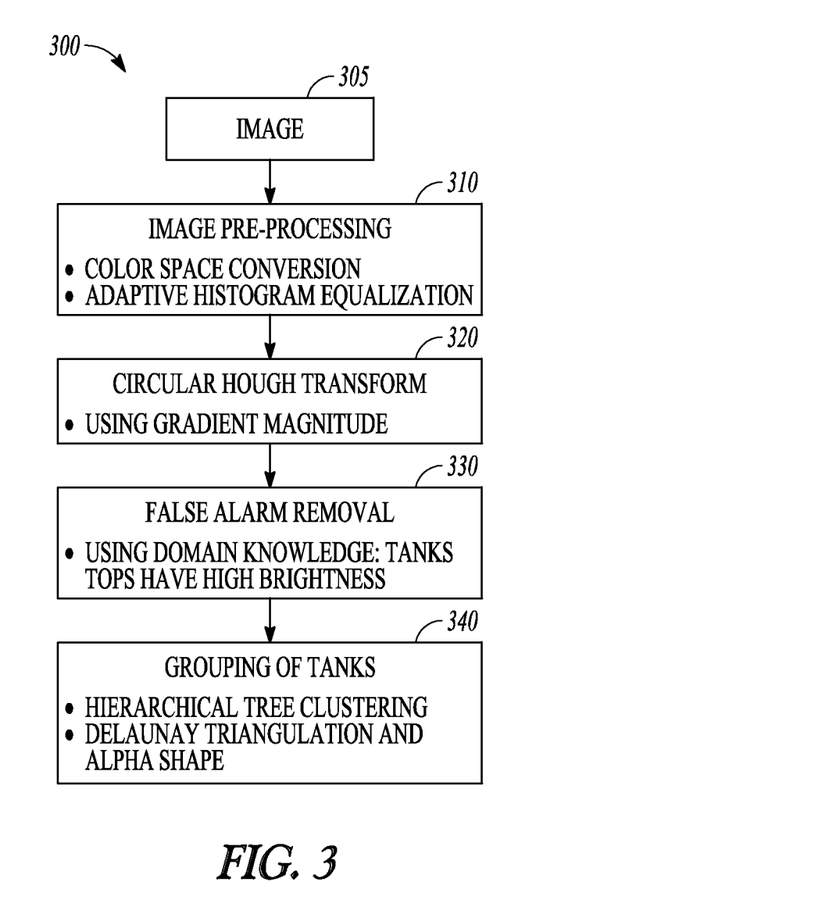
FIG. 3 is a flowchart of an example embodiment of a process to identify and segment clusters of tanks in an industrial area such as a refinery.

FIG. 3 is a flowchart of an example embodiment of a process 300 to identify and segment clusters of tanks in an industrial area such as a refinery. Referring to FIG. 3, the image is received into a computer processor at 305. The image is pre-processed at 310. The pre-processing can include a color-space conversion and an adaptive histogram equalization. Adaptive histogram equalization is a well-known basic image enhancement step helps equalize the pixel values across the image in case dark, highly saturated regions are present in the image. In a block for pre-processing the images, the image color data are recalibrated based on a model generated after texture study of the images, which removes most of the regions which are black due to shadow, hence mitigating the effect of shadow and sunlight angle on the segmentation results. At 320, a circular Hough transform is applied to the image. The circular Hough transform uses a gradient magnitude. The gradient magnitude emphasizes the circular structure of the tanks in the image. This is given as input to the Hough transform to detect this circular structure. False alarms (i.e., the pixels do not represent a tank farm) are removed at 330. Domain knowledge can be used in this operation. For example, the tops of tanks generally are bright in nature. Therefore, if a round object in the image does not have such brightness, it is probably not a tank top, and it is then considered a false alarm. Though the tanks are not always bright at all times, in most cases, this assumption is valid. Also, the complete method explained in this embodiment, when put together, can accommodate these variations with slight approximations of the planning that may not be significant. At 340, the positively identified tanks are grouped. This grouping can involve hierarchical tree clustering and Delaunay triangulation and Alpha shapes. In situations wherein the input image is zoomed in versions, the polygon formulation is done once all of the zoomed in images are processed and all tanks obtained from the concatenated image.

Figure 4:
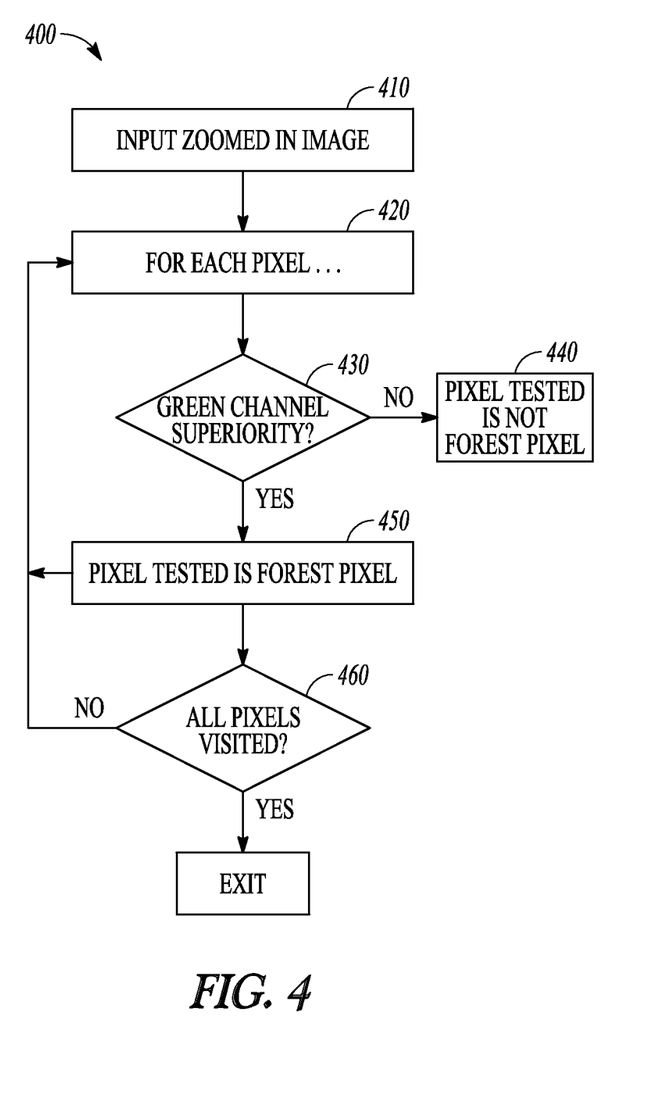
FIG. 4 is a flowchart of an example embodiment of a process to identify and segment vegetation areas in an industrial area such as a refinery.

FIG. 4 is a flowchart of an example embodiment of a process 400 to identify and segment vegetation areas in an industrial area such as a refinery. At 410, the zoomed in input image is the received image. Then, at 420, for each pixel in the zoomed-in image, at 430, it is determined if the green channel of that pixel predominates. If the green channel does not predominate, then it is determined at 440 that that pixel is not a vegetation pixel. If the green channel does predominate for that pixel, then at 450, it is determined that that pixel is part of a vegetation area. At 460, if all pixels in the zoomed-in image have been examined, then the process terminates. Otherwise, operations 430, 440, and 450 are repeated for each remaining pixel in the received image.

Figure 5:
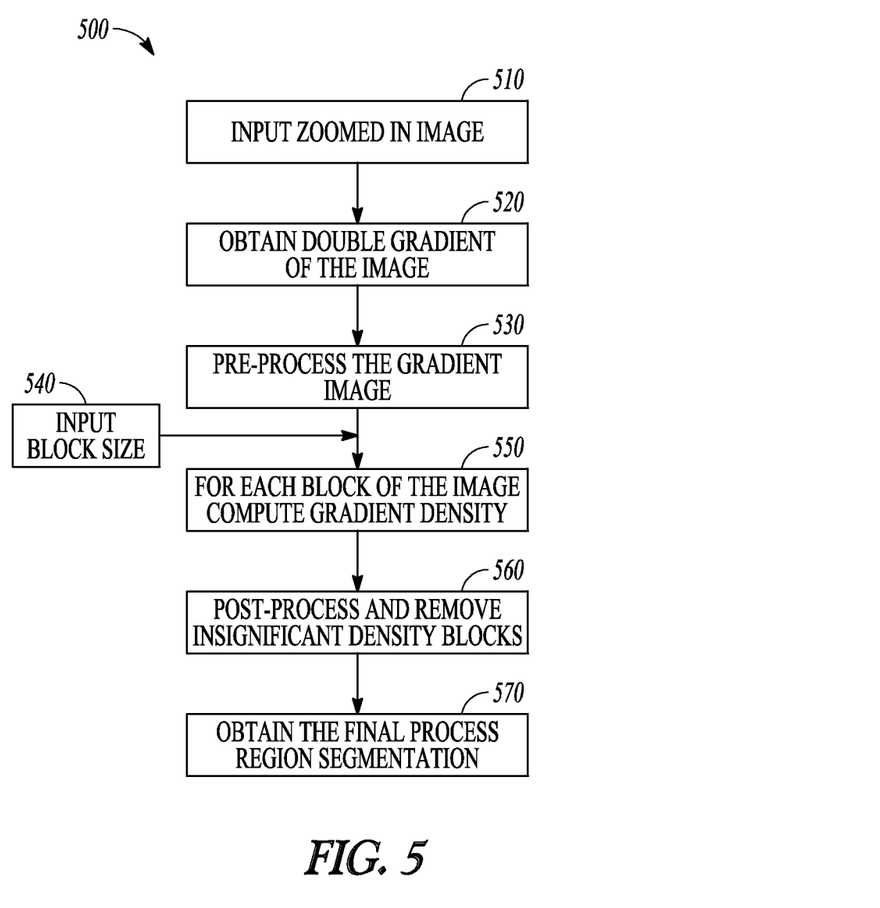
FIG. 5 is a flowchart of an example embodiment of a process to identify and segment process areas in an industrial area such as a refinery.

FIG. 5 is a flowchart of an example embodiment of a process 500 to identify and segment process areas in an industrial area such as a refinery. At 510, an image is received, which is a zoomed in image of part of an industrial image, or an original image as necessary. Edge features have significant impact in process area segmentation. An embodiment describes edge concentrations or patterns within a smaller block or region as a distinguishing feature for segmentation. In this context, the embodiment uses gradient density or texture features for segmentation. Hereinafter, a focus is placed on double gradient features. At 520, a double gradient of the image is obtained, and at 530, the double gradient image is pre-processed to remove insignificant gradients either by a hard threshold or by using a mean and standard deviation method to avoid false detection. A block size is chosen at 540, and for each block of the image, at 550, the gradient density is computed. The gradient density is computed as a total number of gradient pixels that are greater than a threshold in a given image block divided by the number of pixels in the image block. At 560, the block is post-processed and insignificant density blocks are removed. This is done by marking the pixels in insignificant density blocks as zero. At 570, the final process region is obtained and segmented.

Figure 6:
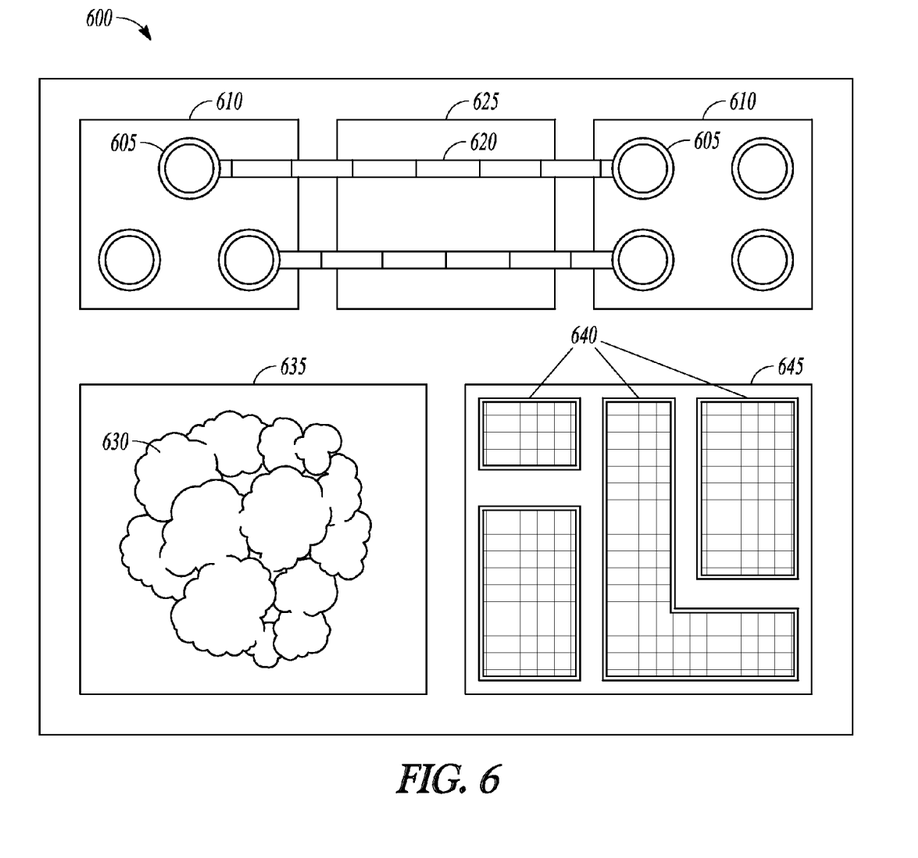
FIG. 6 is a block diagram illustrating an example of an output of a segmentation process wherein a tank area, a process area, a vegetation area, and a building area have been identified and segmented.

FIG. 6 is a block diagram illustrating an example of an output wherein a tank area, a process area, a vegetation area, and a building area have been identified and segmented. Specifically, reference number 605 represents identified tanks, and 610 represents the polygon surrounding the tanks. The reference number 620 indicates pipes that have been identified in the refinery or industrial area, and reference number 625 represents the polygon surrounding the pipes. Reference number 635 is the polygon segmenting the identified vegetation area 630, and 645 is the remaining area that is the building area. The building area is not separately segmented, as is an industrial plant. If a region is not a tank farm, vegetation area, or a process area, it is a building or an area that can be grouped as a building area. It is noted that FIG. 6 is an illustrative example, and that the polygons need not be rectangles, but could be various shapes that are defined as polygons.

Figure 7:
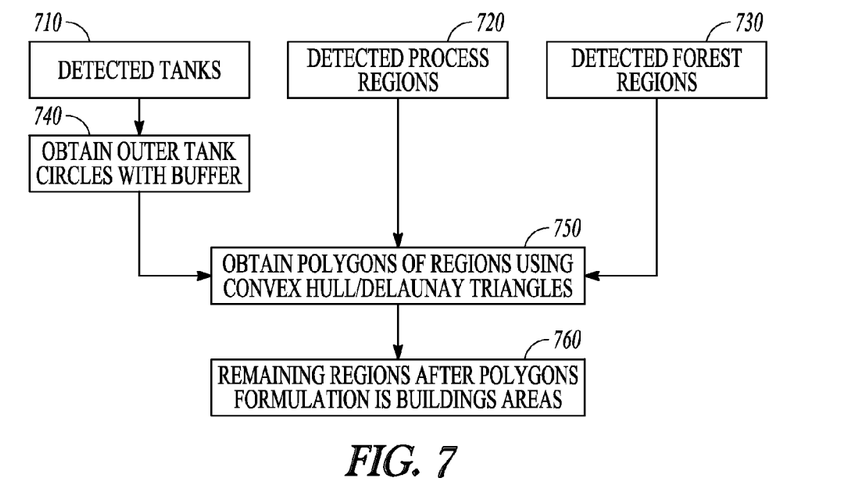
FIG. 7 is a block diagram illustrating an example of polygon formulation after region segmentation.

FIG. 7 is a block diagram of a process of forming polygons from segmented regions. Storage tanks are detected at 710, and outer tank circles are obtained in 740. Process regions are detected at 720 and vegetation regions are detected at 730. At 750, polygons of the regions are obtained using convex hull/ Delaunay triangles. At 760, the regions that remain after the formation of the polygons are the building areas of the industrial plants.

Figure 8:
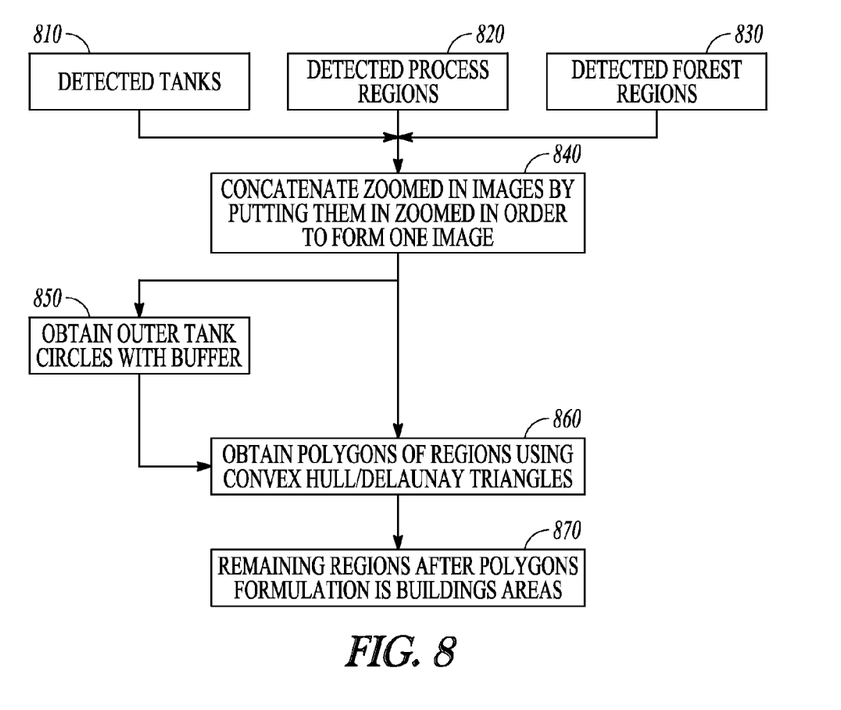
FIG. 8 is a block diagram of polygon formulation when zoomed in aerial images is considered for segmentation.

FIG. 8 is a block diagram of a process of forming polygons of segmented regions when a zoomed in version of sub images are considered for segmentation. First, tanks are detected at 810, process regions are detected at 820, and vegetation areas are detected at 830. At 840, zoomed in images are concatenated by placing them in a zoomed in order such that one image is formed. In the case of tanks, at 850, outer tank circles are obtained. At 860, polygons of regions are obtained using convex hull/Delaunay triangles, and at 870, the regions that remain after the formulation of the polygons are building areas.

Figure 9:
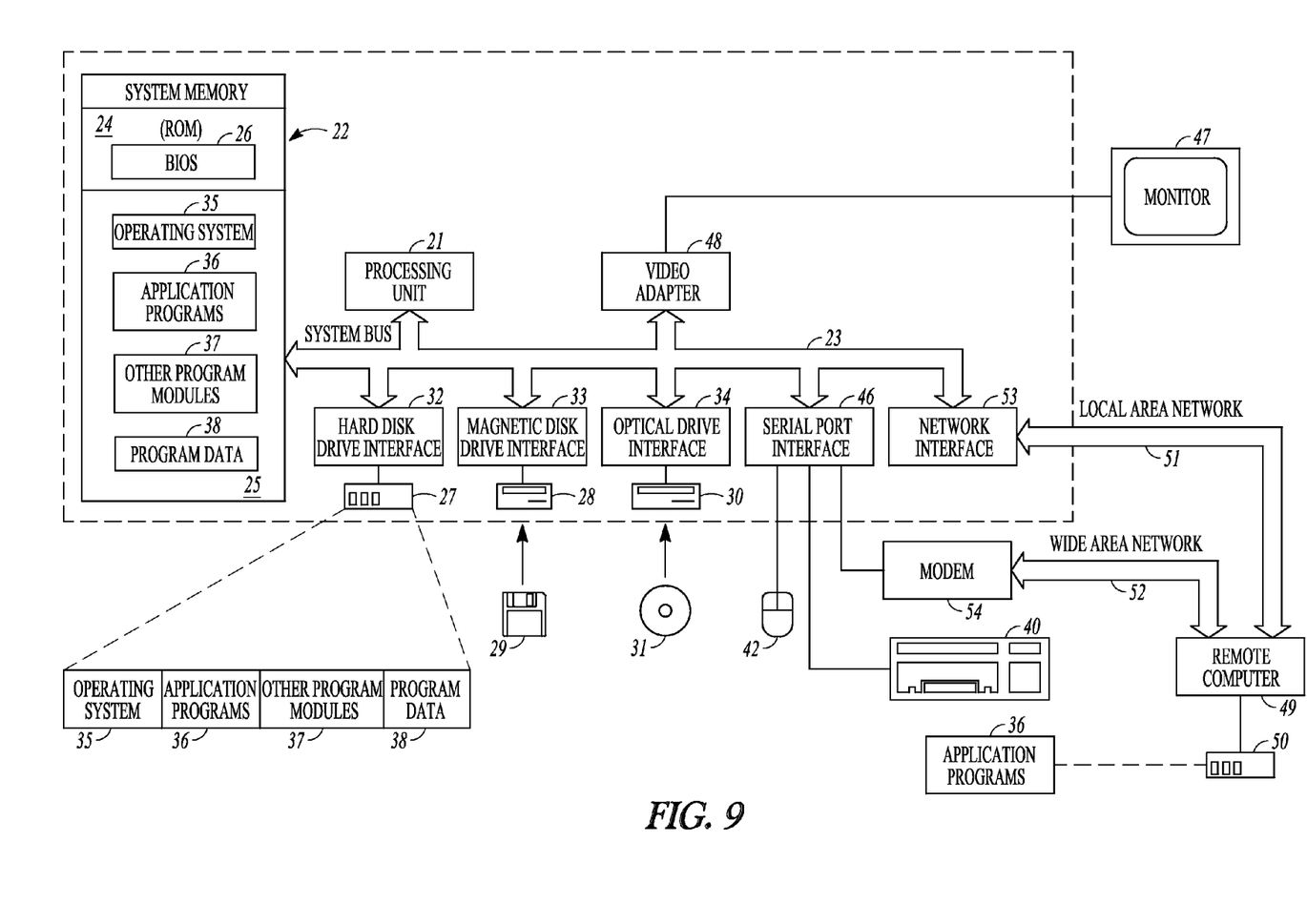
FIG. 9 is a block diagram of a computer system upon which one or more disclosed embodiments can execute.

FIG. 9 is an overview diagram of hardware and an operating environment in conjunction with which embodiments of the invention may be practiced. The description of FIG. 9 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 9, a hardware and operating environment is provided that is applicable to any of the servers and/or remote clients shown in the other Figures.

As shown in FIG. 9, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. A multiprocessor system can include cloud computing environments. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 9 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

It should be understood that there exist implementations of other variations and modifications of the invention and its various aspects, as may be readily apparent, for example, to those of ordinary skill in the art, and that the invention is not limited by specific embodiments described herein. Features and embodiments described above may be combined with each other in different combinations. It is therefore contemplated to cover any and all modifications, variations, combinations or equivalents that fall within the scope of the present invention.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A system comprising:
    a computer processor configured to:
        receive a two dimensional aerial digital image of an area;
        identify one or more circular tanks in the area;
        identify one or more vegetation areas in the area using color information in the digital image;
        identify one or more process areas using edge patterns;
        identify one or more remaining areas as building areas;
        concatenate the one or more tank areas, the one or more vegetation areas, the one or more process areas, and the one or more building areas to form a second digital image;
        create one or more polygons, each polygon encompassing a tank area, a vegetation area, a process area, or a building area in the second digital image; and
        display the second digital image on a computer display device.

2. The system of claim 1, wherein the computer processor is operable to receive latitude and longitude information to identify the area.

3. The system of claim 1, wherein the computer processor is operable to generate or receive a zoomed-in view of the digital image.

4. The system of claim 1, wherein the polygons are created using a convex hull/Delaunay technique triangulation technique on segmented circular tanks, vegetation areas, and process areas of the aerial digital image.

5. The system of claim 1, wherein the polygons are created using a convex hull/Delaunay triangulation technique on segmented circular tanks, vegetation areas, and process areas of the zoomed in aerial digital image.

6. The system of claim 1, wherein the computer processor is operable to identify the one or more circular tanks by:
processing the first aerial digital image via a color space conversion and producing an intermediate image after an adaptive histogram equalization;
using gradient magnitude of the intermediate image on circular Hough transform, thereby identifying circular regions representing tanks in the intermediate image;
removing false alarms by utilizing domain knowledge including identifying pixels that do not have a threshold level of brightness; and
grouping the one or more tanks into a polygonal tank farm area using one or more of a hierarchical tree cluster, Delaunay triangulation, and an alpha shape.

7. The system of claim 1, wherein the computer processor is operable to identify the one or more vegetation areas by:
examining a plurality of pixels to determine whether the pixel comprises a green channel superiority;
clustering one or more groups of pixels comprising the green channel superiority; and
creating a polygon around each of the one or more groups of pixels comprising the green channel superiority.

8. The system of claim 1, wherein the computer processor is operable to identify the one or more process areas by:
creating an edge image of the first digital image;
receiving a sub-image block size;
computing an edge pattern for each sub-image block of the image using features include as texture, gradient, or double gradient;
computing a density of texture, gradient, or double gradient within sub-image blocks;
removing blocks having insignificant feature density; and
creating a polygon around an outer block of segmented image patch having a significant density.

9. The system of claim 1, wherein the two-dimensional image is received from a publically accessible database.

10. The system of claim 1, wherein the aerial image is a zoomed in version of an input image comprising a refinery.

11. The system of claim 1, wherein the concatenation of the one or more tank areas, the one or more vegetation areas, and the one or more process areas are zoomed in and concatenated by placing the zoomed in images in order to form a single image.

12. The system of claim 1, wherein polygon formulation using Delaunay triangulation or convex hull methods is performed based on segmented area boundaries on segmented image that is either the concatenated image or input aerial segmented image.

13. The system of claim 1, wherein computer processor is configured to analyze the second digital image formulated after polygon formation.

14. The system of claim 1, wherein the computer processor is operable to estimate a placement of wireless nodes using the second digital image.

15. A process comprising:
receiving into a computer processor a two dimensional aerial digital image of an area;
identifying with the computer processor one or more circular tanks in the area;
identifying with the computer processor one or more vegetation areas in the area using color information in the digital image;
identifying with the computer processor one or more process areas using edge patterns;
identifying with the computer processor one or more remaining areas as building areas;
concatenating with the computer processor the one or more tank areas, the one or more vegetation areas, the one or more process areas, and the one or more building areas to form a second digital image;
creating with the computer processor one or more polygons, each polygon encompassing a tank area, a vegetation area, a process area, or a building area in the second digital image; and
displaying with the computer processor the second digital image on a computer display device.

16. The process of claim 15, comprising identifying with the computer processor one or more circular tanks by:
processing with the computer processor the first aerial digital image via a color space conversion and producing an intermediate image after an adaptive histogram equalization;
using gradient magnitude of the intermediate image on circular Hough transform, thereby identifying with the computer processor circular regions representing tanks in the intermediate image;
removing with the computer processor false alarms by utilizing domain knowledge including identifying pixels that do not have a threshold level of brightness; and
grouping with the computer processor the one or more tanks into a polygonal tank farm area using one or more of a hierarchical tree cluster, Delaunay triangulation, and an alpha shape.

17. The process of claim 15, comprising identifying with the computer processor the one or more vegetation areas by:
examining with the computer processor a plurality of pixels to determine whether the pixel comprises a green channel superiority;
clustering with the computer processor one or more groups of pixels comprising the green channel superiority; and
creating with the computer processor a polygon around each of the one or more groups of pixels comprising the green channel superiority.

18. The process of claim 15, comprising identifying with the computer processor the one or more process areas by:
creating with the computer processor an edge image of the first digital image;
receiving with the computer processor a sub-image block size;
computing with the computer processor an edge pattern for each sub-image block of the image using features include as texture, gradient, or double gradient;
computing with the computer processor a density of texture, gradient, or double gradient within sub-image blocks;
removing with the computer processor blocks having insignificant feature density; and
creating with the computer processor a polygon around an outer block of segmented image patch having a significant density.

19. The process of claim 15, comprising:
analyzing with the computer processor the second digital image formulated after polygon formation; and
estimating with the computer processor a placement of wireless nodes using the second digital image.

20. A non-transitory computer storage device comprising instructions that when executed by a processor execute a process comprising:
receiving a two dimensional aerial digital image of an area;
identifying one or more circular tanks in the area;

identifying one or more vegetation areas in the area using color information in the digital image;
identifying one or more process areas using edge patterns;
identifying one or more remaining areas as building areas;
concatenating the one or more tank areas, the one or more vegetation areas, the one or more process areas, and the one or more building areas to form a second digital image;
creating one or more polygons, each polygon encompassing a tank area, a vegetation area, a process area, or a building area in the second digital image; and
displaying the second digital image on a computer display device.

* * * * *